United States Patent
Rogak et al.

(10) Patent No.: US 8,322,325 B2
(45) Date of Patent: Dec. 4, 2012

(54) CONCURRENT INJECTION OF LIQUID AND GASEOUS FUELS IN AN ENGINE

(75) Inventors: Steven N. Rogak, Vancouver (CA); William Kendal Bushe, Vancouver (CA); Gordon McTaggart-Cowan, Derby (GB)

(73) Assignee: The University of British Columbia, Vancouver, British Columbia (CA)

( * ) Notice: Subject to any disclaimer, the term of this patent is extended or adjusted under 35 U.S.C. 154(b) by 560 days.

(21) Appl. No.: 12/306,912

(22) PCT Filed: Jun. 29, 2007

(86) PCT No.: PCT/CA2007/001175
§ 371 (c)(1),
(2), (4) Date: Feb. 19, 2010

(87) PCT Pub. No.: WO2008/000095
PCT Pub. Date: Jan. 3, 2008

(65) Prior Publication Data
US 2010/0199948 A1   Aug. 12, 2010

Related U.S. Application Data

(60) Provisional application No. 60/817,079, filed on Jun. 29, 2006.

(51) Int. Cl.
*F02D 19/06* (2006.01)
(52) U.S. Cl. .................... 123/304; 123/527; 123/575
(58) Field of Classification Search .............. 123/27 GE, 123/304, 525–526, 575–577
See application file for complete search history.

(56) References Cited

U.S. PATENT DOCUMENTS

| 5,549,083 | A | 8/1996 | Feuling |
| 5,775,282 | A | 7/1998 | Smith |
| 6,073,862 | A * | 6/2000 | Touchette et al. .......... 239/408 |
| 6,439,192 | B1 | 8/2002 | Ouellette et al. |
| 6,761,325 | B2 | 7/2004 | Baker et al. |
| 7,373,931 | B2 * | 5/2008 | Lennox et al. ............. 123/525 |
| 7,861,696 | B2 * | 1/2011 | Lund ........................ 123/525 |
| 8,166,956 | B2 * | 5/2012 | Ulrey et al. ................ 123/525 |
| 2008/0245318 | A1 * | 10/2008 | Kuroki et al. .............. 123/3 |

FOREIGN PATENT DOCUMENTS

| CA | 2 532 775 A1 | 10/2006 |
| EP | 0 872 634 A1 | 10/1998 |

* cited by examiner

*Primary Examiner* — Erick Solis
(74) *Attorney, Agent, or Firm* — Kilpatrick Townsend & Stockton LLP

(57) ABSTRACT

Disclosed is a method and corresponding fuel injector for injecting gaseous and liquid fuel into an engine. The method comprises delivering a liquid fuel to a fuel injector, delivering a pressurized gaseous fuel to the fuel injector, entraining the liquid fuel within the gaseous fuel within a chamber of the fuel injector and injecting the gaseous fuel and atomized liquid fuel into the combustion chamber. The liquid fuel can be passed through and dispensed from a needle into a chamber in the injector nozzle where it is entrained in the gaseous fuel during an injection event. The liquid/gas mass ratio is controlled by the needle movement, hydraulic resistances or electronic valves so that the majority of the liquid is injected during the first part of the gas injection. The injector can be used for late cycle direct injection of natural gas, or any number of gaseous fuel blends combined with many liquid fuels such as diesel, biodiesel and DME.

38 Claims, 9 Drawing Sheets

CONCURRENT INJECTION OF LIQUID AND GASEOUS FUELS IN AN ENGINE

CROSS REFERENCE TO RELATED APPLICATIONS

This application is a National Stage of International Application No. PCT/CA2007/001175 filed Jun. 29, 2007 and which claims the benefit of U.S. Provisional Application No. 60/817,079, filed Jun. 29, 2006, the disclosures of all applications being incorporated herein by reference.

BACKGROUND OF THE INVENTION

1. Field of Invention

The present invention relates to fuel injection in general and in particular to a method and apparatus for the injection of liquid and gaseous fuels directly into the combustion chamber of an engine.

2. Description of Related Art

The book, *The Modern Diesel Engine*, (Geoffrey Smith, Ed., Ilife and Sons Ltd, London, 1942) describes the most advanced practical and experimental diesel engine technology up to about 1942. The Ricardo Comet, Lanova air-cell and Acro air-cell systems use a small side chamber connected to the main combustion chamber by a small passage. When the piston moves down, the high pressure gases stored in the side chamber rush through the passage to the main chamber, creating a high-velocity jet that may be used for atomization and mixing of the jet. Cummins Engine Co. produced engines in the 1930's with an air-cell in the piston, which produced an air jet aimed directly at the fuel injector, supposedly improving the air supply to the burning fuel.

U.S. Pat. No. 6,564,770 B1, May 2003 (Geoffrey Cathcart, assigned to Orbital Engine Company) discloses a "Method of Injection of a Fuel-Gas Mixture to an Engine". This patent is directed to co-injection of air and liquid fuel (typically gasoline) into a direct-injection spark ignition engine. By injecting air with the fuel, it is possible to prevent the over-rich regions that would lead to high emissions. The core of the invention seems to be the use of multiple injection events, combined with the air injection, to achieve a desirable fuel-air mixture prior to ignition. The embodiments discussed refer to a spark ignition engine. This patent teaches the trapping of cylinder gases (as opposed to using a compressed air source) for later use in atomizing the fuel.

U.S. Pat. No. 6,427,660 B1 Aug. 6, 2002 to Yang (assigned to Ford Global Technologies) titled "Dual Fuel Compression Ignition Engine" disclosed the use of low-pressure (15-45 bar) natural gas and diesel co-injection, typically injected prior to top-dead center to operate in a stratified, mostly premixed combustion mode. Split injections are possible depending on the load. The injector incorporates a mixing-chamber into which diesel is injected through a first valve and sits in the chamber until the gaseous fuel valve opens and the gaseous fuel atomizes the diesel and the whole mixture is injected into the combustion chamber. The fact that the gaseous fuel is at moderately low pressure precludes the possibility of late-cycle gaseous fuel injection (peak cylinder pressures in some engines can approach 100 bar). High gaseous fuel pressure (>250 bar) can be a critical part of maintaining high-efficiency and low emissions with exhaust gas recirculation (EGR).

U.S. Pat. No. 5,067,467 November 1991 to Hill et al. (originally assigned to the University of British Columbia) titled "Intensifier-Injector for Gaseous Fuel for Positive Displacement Engines" discloses the idea of using natural gas to continuously atomize diesel in a prechamber without control of the relative timing for liquid pilot and gaseous fuels (i.e., there is no means taught for controlling the liquid/gaseous fuel mass ratio and there is no teaching of anything about metering the liquid fuel or anything about injection phasing). The apparatus described uses a poppet valve injector and the method is described as "gas blast" atomization.

U.S. Pat. No. 6,598,584 B2 Jul. 29, 2003 to Beck et al. (Clean Air Partners Inc.) titled "Gas-Fueled, Compression Ignition Engine with Maximized Pilot Ignition Intensity" relates to pilot-ignition of a premixed natural gas/air charge (commonly referred to as fumigation), the basic concept of which is very old—all the major engine companies have tried variations of this sort. The key novelty disclosed in this patent appears to be the concept of injecting the pilot for a period shorter than the ignition delay or the "mixing time". Presumably this results in more widespread ignition of the premixed charge and lower emissions. The patent describes in detail the importance of a particular injector geometry (interference angles for the needle-seat seal).

U.S. Pat. No. 6,073,862 Jun. 13, 2000 to Touchette et al., (Westport Research) "Gaseous and Liquid Fuel Injector" includes a detailed review of prior art, including the work of Miyake et al. 1987, who describe a single injector with two concentric needles injecting pilot and high-pressure gaseous fuel through separate holes.

U.S. Pat. No. 4,414,229 Nov. 22, 1983 to Wood (assigned to Southwest Research) "Fuel Injection System for Diesel Engines" describes a dual-fuel injector for liquid fuels. As in the other co-injectors reviewed here, the diesel fuel (pilot) is introduced into a chamber in the injector prior to lifting the needle with the pressure of the second fuel. The concept of injecting the pilot first is discussed with respect to efficient ignition. This invention cannot work for a main injection of gaseous fuel because the needle is actuated by an increase in pressure of the alternative fuel. Fuel injectors cannot be actuated rapidly enough by changes in gaseous fuel pressure because gaseous fuel is so compressible. Also, it appears that the intention is to create a "charge" of diesel fuel (DF) below the alternative fuel (AF) which is all injected essentially sequentially (DF first) when the needle is lifted. There seems to be no way of limiting the DF/AF mass ratio during the early part of the injection.

U.S. Pat. No. 4,742,801 May 10, 1988, to Kelgard "Dual Fuel Mobil Engine System" discloses a system for burning gaseous fuels or liquefied petroleum gas (e.g. propane, LPG) in a diesel engine with a pilot diesel engine using separate injectors for the diesel and gaseous fuel.

U.S. Pat. No. 6,484,699 to Paul et al. teaches a "universal fuel injector" for automatically switching from injecting a combination of two fuels or one fuel when the second fuel is not available. For example, if the second fuel is a gaseous fuel, liquid fuel is introduced through one connection and gaseous fuel is introduced through a different connector. While the '699 patent discloses a liquid fuel distributor, it does not teach anything about metering the liquid fuel or anything about injection phasing.

US 2006/0086825 Application to Date et al. filed 24 Oct. 2005 discloses a fuel injector that co-injects gaseous and liquid fuels. The liquid fuel assists with combustion and lubricates the needle at sliding interfaces and where the needle tip impacts against the seat. The application provides no guidance on how to achieve desirable (or even operable) mass ratios of liquid fuel to gaseous fuel during injections.

SUMMARY OF THE INVENTION

The present invention relates to a fuel injector capable of injecting an ignition-promoting liquid fuel (henceforth, simply "liquid") and a high-pressure gaseous fuel (henceforth, simply "gas") in an internal combustion engine. The invention pertains specifically to an injector in which both liquid and gas are injected into the combustion chamber through the same injection hole(s).

The present invention also relates to a method and apparatus for operating an internal combustion engine using a combustible gas under pressure in combination with a controlled quantity of a liquid igniter fuel wherein the controlled quantity of liquid is carried into a combustion chamber and atomized by the flow of gas to the combustion chamber. The liquid can contain additives to reduce exhaust emissions (such as water, alcohols and biodiesel), while the gas can be any blend of hydrocarbons and hydrogen that can be combusted in the combustion chamber, such, as, for example, natural gas, syngas, biogas and mixtures thereof. As found in the recited examples, the gas can also comprise non-reactive gases.

The liquid start of injection can be slightly delayed from the gas start of injection, in order to control atomization and emissions. The injector is capable of delivering at least a certain minimum liquid/gas mass ratio during the initial part of the injection. Liquid injected during the middle and end of the injection is undesirable. If the initial liquid/gas mass ratio is too high, then liquid atomization can be poor, leading to excessive exhaust emissions. If multiple injections are used for each combustion cycle, then the first injection should have the highest liquid/gas mass ratio. Controlling the liquid/gas mass ratio in the initial part of the injection is an important objective of the method and apparatus described below, not taught in the prior art.

The present injector introduces the liquid into an accelerating gas stream within the body of the injector to entrain the liquid within the gas for atomization of the liquid as the mixture is injected into the combustion chamber.

Single-Actuator Embodiments

Liquid fuel can be metered into the injector by means of a control orifice and a regulated liquid/gas pressure differential, which can be made a function of engine speed. In some embodiments, the liquid fuel flow is further limited by the movement of the needle, which can open or close liquid flow passages in addition to performing its primary function of controlling fuel injection into the engine combustion chamber.

Dual-Actuator Embodiments

Liquid fuel can be metered into the injector at controllable times using a second movable needle inside the main needle, an external control valve (such as solenoid, piezo), or an external distributor pump of the sort found on many diesel engines.

Accordingly, there is provided a method for concurrently injecting a liquid fuel and a gaseous fuel directly into a combustion chamber of an internal combustion engine, the method comprising:
  delivering the gaseous fuel to a fuel injector;
  delivering the liquid fuel to the fuel injector;
  injecting the gaseous and liquid fuels into the combustion chamber by actuating a valve member, whereupon liquid fuel is entrained into the gaseous fuel within a chamber of the injector, and a mixture of gaseous fuel and liquid is injected into the combustion chamber where the expanding gaseous fuel atomizes the liquid fuel; and
  controlling the mass ratio of the liquid and gaseous fuels during the injecting step so that a majority of the liquid fuel is injected closer to the start rather than the end of the injecting step.

In a further aspect, there is provided a fuel injector for concurrently injecting a liquid fuel and a gaseous fuel directly into a combustion chamber of an internal combustion engine, the fuel injector comprising:
  a fuel injector body;
  a valve member, disposed in a cavity provided within the fuel injector body, and moveable between a closed position when a sealing surface of the valve member is pressed against a seat, and an open position when the valve member is lifted from the seat;
  a nozzle chamber defined by an annular space between the valve member and the fuel injector body, and in fluid communication with the combustion chamber when the valve member is in the open position;
  a gaseous fuel supply line in fluid communication with the nozzle chamber through which gaseous fuel is deliverable into the nozzle chamber;
  an interior passage disposed within the valve member into which the liquid fuel is deliverable from a liquid fuel supply line; and
  a metering device operatively associated with the fuel injector for controlling dispensing of the liquid fuel from the interior passage into the nozzle chamber so the liquid fuel is entrained in the gaseous fuel flowing through the nozzle chamber during an injection event and so that the majority of the liquid fuel is injected closer to the start rather than the end of the injection event.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Single-Actuator Apparatus

First Embodiment

Figure 1:
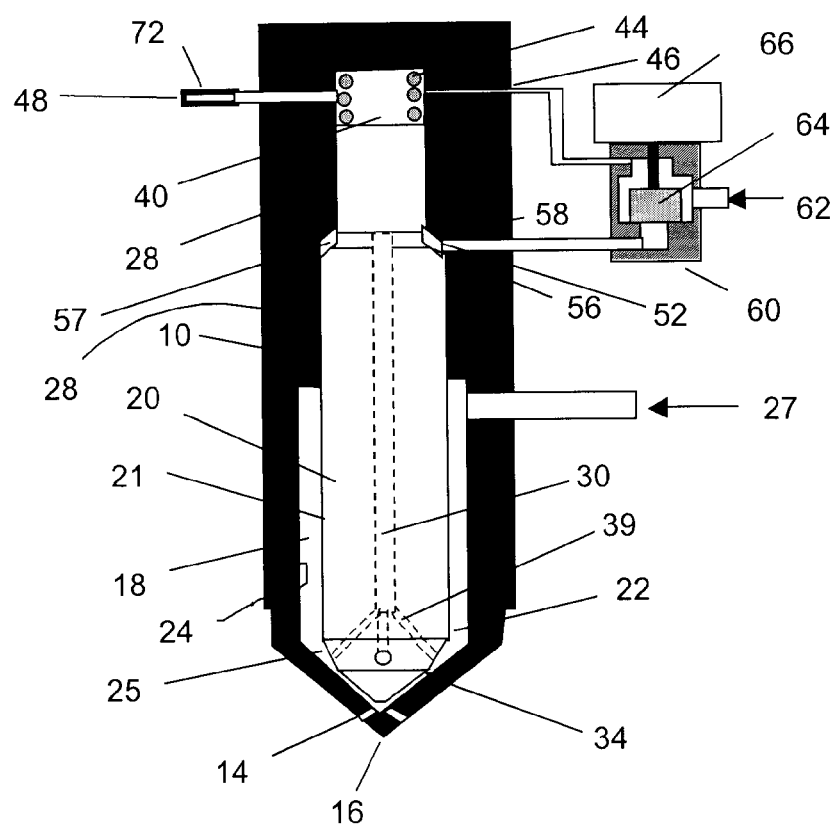
FIG. 1 is a cross sectional view of an injector according to an embodiment of the present invention including a shoulder and a contact seal on the needle, and a three-way control valve.

Referring to FIG. 1, a fuel injector according to a first embodiment of the invention is shown. The injector can be located in an aperture in a cylinder head of an internal combustion engine.

The fuel injector includes injector body 10 having injection holes or orifices 14 at a first end 16 thereof. Injector body 10 includes central cavity 18 formed by cavity wall 24 and includes slidable needle 20 therein. At a lower portion of central cavity 18, needle 20 forms lower chamber 22, which serves as a plenum or small accumulator, annularly disposed between needle 20 and cavity wall 24. The lower chamber includes tapered end 25 at first end 16 of the injector wherein injection holes 14 allow the combustion chamber of an internal combustion engine (not shown) to be in fluidic communication with tapered end 25 of the lower chamber when needle 20 is lifted from seat 34. The lower chamber further communicates with gas inlet port 27 operable to supply the lower chamber with a quantity of gaseous fuel from a fuel compressor, common rail or other conventional manner. At upper portion 28 of central cavity 18 needle 20 is in slidable and sealable communication with cavity wall 24.

Needle 20 comprises a substantially cylindrical body having exterior wall 21 and includes a central liquid passage 30 which is shown in this embodiment as a bore formed within needle 20. The lower end of the needle is shaped to provide a sealing surface that can be pressed against tapered end 25 of the lower chamber so as to seal lower chamber 22 when the needle is commanded to a closed position. The position of the seal (or "seat") is shown at 34. The needle includes a plurality of exit bores 39 extending radially from passage 30 to lower chamber 22 above needle seat 34.

The upper end of needle 20 comprises a substantially planar end surface perpendicular to the axis of needle 20. Upper chamber 40 is formed in the injector body above the needle. The upper chamber includes spring 44 positioned and oriented to urge needle 20 out of upper chamber 40 towards seat 34 (the "closed position"). The upper chamber further includes inlet port 46 to supply the upper chamber with a hydraulic fluid and outlet port 48 to relieve the upper chamber of hydraulic fluid. As shown in the embodiment of FIG. 1, the hydraulic fluid can be liquid ignition promoting fuel. The injector needle and injector body can each be constructed from several pieces for convenience.

Control valve 60 which includes liquid supply line 62, plunger 64 and actuator 66 is provided to control the flow of liquid to the injector. In the embodiment of FIG. 1, control valve 60 is a three-way valve.

Between injections, control valve 60 is in a "closed" position, which connects upper chamber 40 to high-pressure liquid supply line 62. Spring 44 and the pressure of the liquid in upper chamber 40 keep needle 20 in the closed position, sealing lower chamber 22 and passage 30 from the combustion chamber. The liquid is prevented from flowing through exit bores 39 because control valve 60 is "closed" so liquid can not flow from liquid supply line 62 to passage 30.

At the command-start-of-injection (CSOI), which can be received from an engine management computer, mechanical or other known means, actuator 66 of control valve 60 lifts valve plunger 64, which disconnects upper chamber 40 from liquid supply line 62 and connects liquid inlet port 52 for passage 30 of needle 20 to the high-pressure liquid supply line. Liquid then flows through passage 30 to exit bores 39 as needle 20 is lifted from seat 34 at a rate determined by orifice 72 at liquid outlet port 48. From outlet port 48, the liquid can return to the liquid tank (not shown). When needle 20 is lifted from seat 34, gas flow is initiated and begins to flow through gas inlet port 27 into lower chamber 22 and out of injector orifices 14, entraining and atomizing the liquid to create a mixed fuel injection charge. The quantity of liquid injected is limited by how much liquid flows through middle chamber 57 before needle 20 rises fully and upper seat 56 contacts surface 58, thereby blocking the supply of further liquid.

At the end of injection, control valve 60 returns to the closed position, which is the position associated with when valve plunger 64 again connects upper chamber 40 with high-pressure liquid supply line 62 and blocks flow to liquid inlet port 52. Re-establishment of pressure in upper chamber 40 causes needle 20 is move downwardly. As needle 20 moves downwardly toward seat 34, upper seat 56 no-longer blocks the liquid flow to the needle passages, but liquid flow is instead blocked by valve plunger 64. Thus, the liquid/gas mass ratio is large at the beginning of an injection event, but very low at the middle and end of the injection event.

The pressure differential that drives the liquid flow arises because:

a) the liquid supply line 62 (or rail) is at a slightly higher pressure $P_L$ than the gas supply 27 rail $P_G$; and b) high gas velocity near the needle tip produces a lower pressure (as in a venturi).

By virtue of the arrangement of injection orifices 14, and the regulation of liquid flow to passage 30, liquid does not collect within the injector passage for gas flow through the injector, but is continuously atomized. Similarly, exit bores 39 from passage 30 can also be positioned to enhance the operation of the invention i.e., for improved operation they should be adjacent to and immediately upstream of the contact line or seal 34. It is believed that if the liquid is injected into a gas flow with sufficiently high velocity, it will be carried out almost immediately and not pool in lower chamber 22. Excessive pooling of the liquid would not be desirable because it could reduce the ability to control the timing of the liquid injection. Accumulated liquid could lead to poor atomization, particularly near the end of the gas injection.

Second Embodiment

Figure 2A:
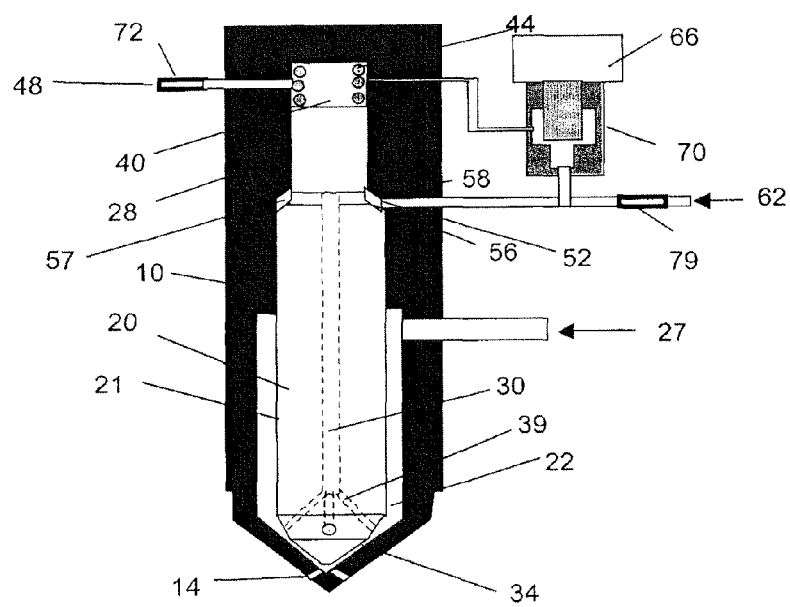
FIG. 2a is a cross sectional view of an injector according to a further embodiment of the present invention having a simple on/off control valve.

FIG. 2 shows a second embodiment of the fuel injector in which parts identical to those of the first embodiment are labeled with the same reference number. Like the first embodiment, the second embodiment shown in FIG. 2 middle chamber 57 is defined between needle shoulder 56 and contact seal 58. However, the second embodiment uses simple on-off control valve 70 rather than 3-way control valve 60, which is used by the first embodiment. In the second embodiment, the fuel injector is further provided with supply orifice 79 between liquid supply line 62 and control valve 70.

The operation of the fuel injector of FIG. 2 can be understood by considering pressures at 5 locations and fluid resistances at 3 locations, $P_D$—pressure at drain outlet port 48 which in most instances is atmospheric pressure; (P~0)

$P_L$—supply pressure of liquid supply line 62

$P_G$—gas rail pressure at gaseous fuel inlet port 27 which can be several hundred bar;

$P_{up}$—pressure in upper chamber 40;

$P_{mid}$—pressure in middle chamber 57 of the injector.

The fluid resistances imparted by the small orifices are dynamic and the pressure drop across these orifices varies in a complex way with the transient flows. However, for the sake of describing the function of the disclosed injector, they can be treated as simple resistances giving a linear relation between flow and pressure. The resistances are:

$R_D$—is the resistance across drain orifice 72;
$R_S$—is the resistance across supply orifice 79; and
$R_P$—is the net resistance of liquid injection passage 30 and exit bores 39.

When needle 20 is seated and control valve 70 is open, upper chamber 40 and middle chamber 57 are pressurized by liquid flowing from liquid supply line 62.

$$P_{up} = P_{mid} = R_D/(R_D + R_S)P_L$$

The resistances should be chosen so that $P_{mid} \sim P_G$ so that there is no significant flow into the gas passages. An additional check valve (not shown) between orifice 79 and chamber 57 can prevent backflow of gas in the event that $P_{mid} < P_G$. Exit bores 39 are partially blocked at the bottom of needle 20, but there is not a tight seal.

When control valve 70 closes, $P_{up}$ approaches $P_D$ at a rate set by $R_D$ thereby reducing the downward closing force acting on needle 20. $P_{mid} \sim P_L$ but needle 20 starts to lift because of the reduced closing force and this restricts liquid flow through chamber 57 as shoulder 56 rises to meet contact seal 58. When needle 20 starts to lift from seat 34 liquid is injected with gas through orifices 14.

When needle 20 rises to the position of maximum lift, liquid flow is shut off by shoulder 56 engaging contact seal 58, even though the pressure remains above $P_G$.

At the command end of injection, control valve 70 opens, so $P_{up}$ and $P_{mid}$ return to near $P_G$. Very little liquid is injected as needle 20 moves downwardly because the pressure differential is very small.

Figure 2B:
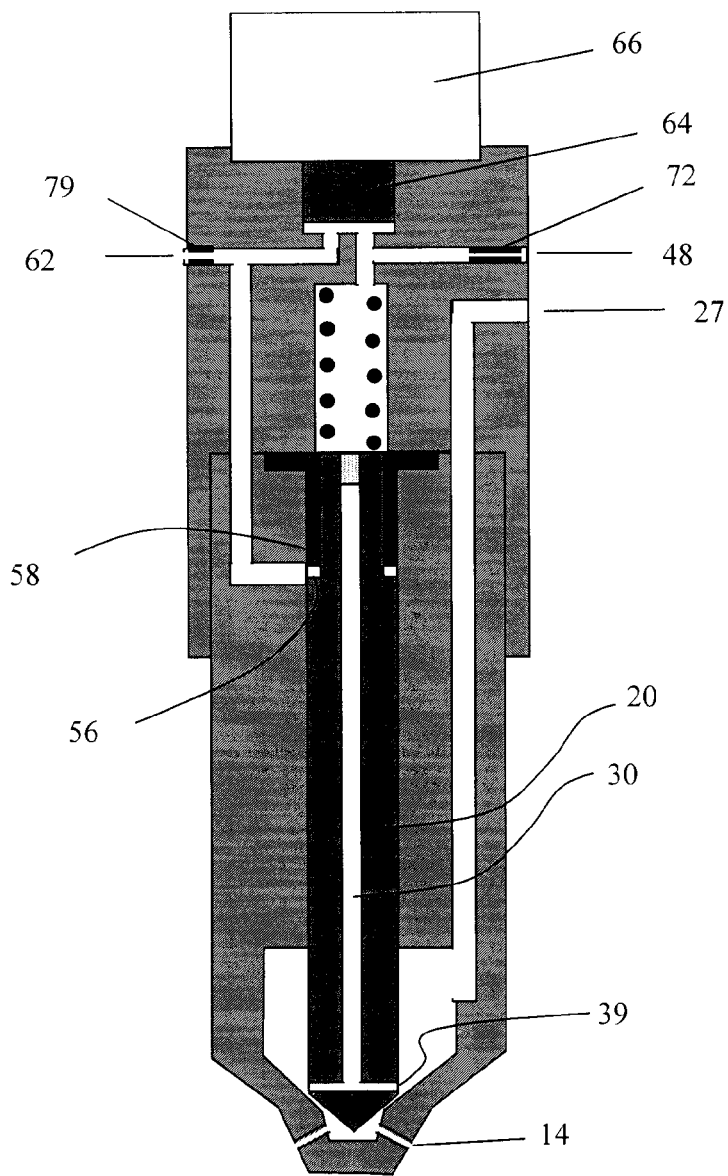
FIG. 2b is a cross-sectional view of an injector according to the embodiment of FIG. 2 showing an alternative arrangement.

FIG. 2b shows a preferred arrangement of the second embodiment in which the various components are arranged in a manner closer to the anticipated actual construction. FIG. 2 is a more schematic illustration of second embodiment which is useful for comparison with FIG. 1, and shows more clearly the parts of on/off control valve 70. In the arrangement of FIG. 2b, on-off control valve 70 is integrated into the top of the injector with plunger 64 under the control of actuator 66 being used to control liquid supply line 62 and liquid outlet port 48. FIG. 2b also shows an alternative arrangement for the shoulder 56 and sealing surface 58. Shoulder 56 on needle 20 and sealing surfaces 58 do not need to be beveled as shown schematically in FIG. 2. Square sealing surfaces are also possible, and a skilled person will appreciate that still further arrangements can be used.

Third Embodiment

Figure 3:
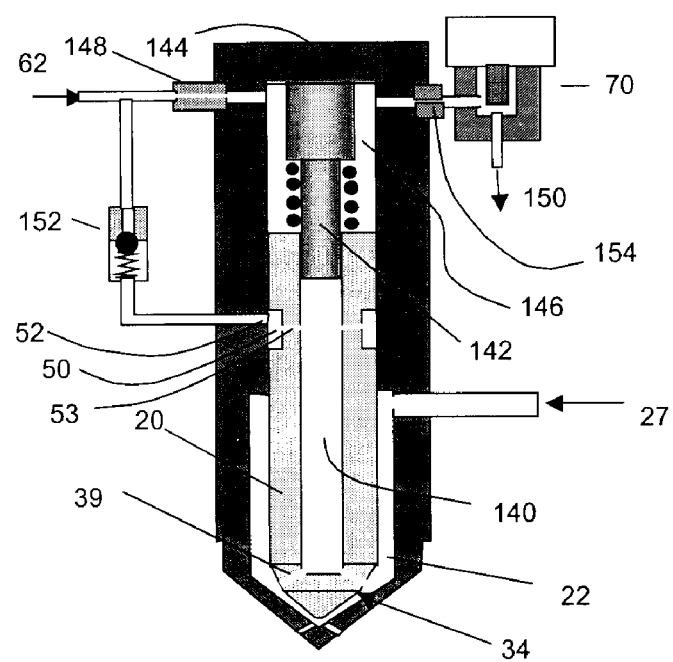
FIG. 3 is a cross sectional view of an injector using a plunger within the needle to meter the quantity of liquid injected.

Referring now to FIG. 3, a further embodiment of the present invention is shown. According to this embodiment, needle 20 includes enlarged central passage 140 extending to the upper end of the needle. Central passage 140 contains plunger 142, preferably with a substantially liquid-tight sliding seal. In this instance, persons skilled in the technology will understand that the word "substantially" means that plunger 142 and passage 140 are made with a matched fit or with a seal that reduces any leakage to an amount that does not affect the operation of the apparatus as described herein. Plunger 142 is always in contact with injector cap 144 although it is not fastened to the cap.

The contact between cap 144 and plunger 142 is due to the balance of forces. The injector includes upper chamber 146 which is supplied with liquid from supply line 62. Orifice 148, which is located between upper chamber 146 and supply line 62, throttles the liquid flow to upper chamber 146. The liquid is also supplied through check valve 152 to liquid inlet port 52 in the side wall of the injector which is in fluidic communication with annular groove 50 in needle 20. Groove 50 is connected by radial passages 53 to central passage 140.

Like in the other disclosed embodiments, gaseous fuel is supplied from gas supply passage 27 to lower chamber 22, provided in the nozzle of the injector.

When control valve 70 opens, the pressure in upper chamber 146 falls, and needle 20 lifts from seat 34. Liquid inside passage 140 of needle 20 is forced through liquid exit bores 39 near the bottom of needle 20 into the gaseous fuel flowing through lower chamber 22 and out through the nozzle orifices. This provides most of the liquid flow at the preferred time when needle 20 is rising. Check-valve 152 ensures the liquid injection quantity is proportionate to the stroke of needle 20. If control valve 70 is now closed, the upper chamber 146 pressure rises, forcing needle 20 down with the aid of spring 44. When pressure inside passage 140 falls to below the liquid supply pressure, check valve 152 allows liquid to refill needle passage 140.

The rise and fall rates of the needle are determined mainly by the sizes of supply and drain orifices 148 and 154, respectively which can be adjustable during service, for example, by substituting an orifice of one size for another orifice of a different size. The liquid supply pressure at 62 can be adjusted during operation in response to operating conditions. The pressure at drain 150 can also be adjusted during operation. The stroke of needle 20 can be adjusted by the position of cap 144 and/or by adding or removing shims in upper chamber 146.

(General Flow Description and Further Single-Actuator Embodiments)

In the embodiments shown in FIGS. 1-3, the needle of the injectors is hydraulically operated. As previously indicated, the hydraulic fluid for this actuation can be the liquid igniter fuel as is shown or it can alternatively be an additional hydraulic fluid. In embodiments including hydraulically operated injectors, the changing liquid pressure can be exploited to control the proportion of liquid and gas injected throughout the injection phase. This would not however be suitable for piezo, direct solenoid, or other direct needle actuation methods.

Figure 4:
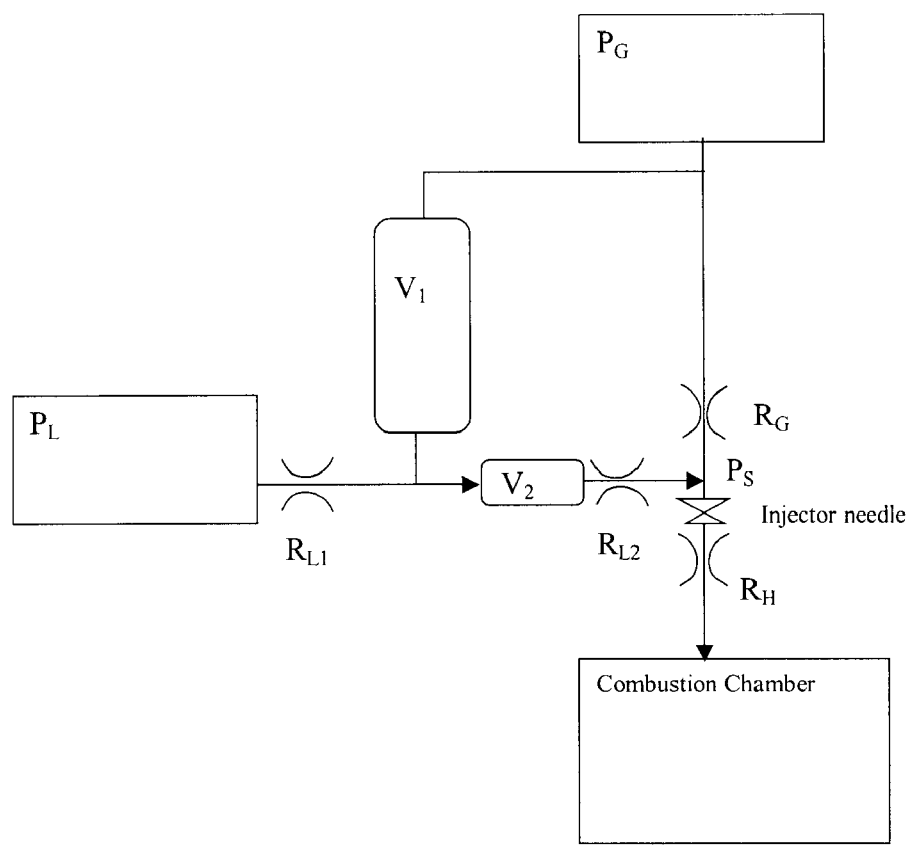
FIG. 4 is a schematic drawing of the liquid and gas flow passages, resistances and capacitances.

Turning now to FIG. 4, a schematic flow diagram of liquid fuel and gas fuel flow passages in another embodiment of an injector system are shown in which the actuation of the injector can be of any known means. Like the other embodiments, this embodiment provides elements for controlling the liquid/gas mass flow ratio during an injection event.

The injector system of FIG. 4 can operate as follows:
1. With the injector needle down (closed), there is essentially no gas flow so seat pressure is the same as the gas rail pressure, i.e., $P_S = P_G$. With $P_L > P_G$, there is liquid flow into the injector, mostly into first reservoir $V_1$ because of the resistance $R_{L2}$. $V_1$ accumulates the desired total liquid quantity over a complete cycle (usually 720 crank angle degrees). Meanwhile, reservoir $V_2$ remains filled mainly with gas (see step 3 below), thereby controlling the delay of liquid injection with respect to gas. If $V_2$ and $R_{L2}$ are small, then liquid can accumulate closer to the needle seat and can be injected ahead of, or at the same time as, the first gas is injected.
2. When the needle lifts (opening), flow is established through $R_G$, so now $P_S < P_G$. The liquid will be forced by gas (pressure $P_G$) out of $V_1$, through $V_2$, to the mixing point at pressure $P_S$. Note that if $V_2$ is filled with gas, there will be a delay between the needle lift and the liquid injection.

3. After $V_1$ is purged of liquid fuel (some liquid fuel can adhere to the $V_1$ walls without impairing operation), $R_{L1}$ permits only a tiny amount of liquid flow to continue.

Before discussing more specific embodiments, some general operational features should be noted.

1. As engine RPM increases, it can be necessary to increase the liquid fuel bias ($P_L - P_G$) because the time available to accumulate liquid fuel in $V_1$ decreases. This can be accomplished by many different electronic or mechanical means. For example, the liquid pump flow is normally proportional to engine speed, so that an appropriately sized and placed flow resistance can create the extra bias pressure as needed.

2. Split or multiple injections per cycle are possible. The first injection will have a much larger quantity of liquid fuel because the short time between multiple injections does not allow much liquid to be restored to V1 because of the restriction provided by $R_{L1}$.

3. Depending on the configuration of the liquid fuel passages, resistances $R_{L2}$ and $R_G$ can be made a function of needle lift. This provides an extra parameter for design optimization, and an extra method for changing injection parameters during operation.

Figure 5:
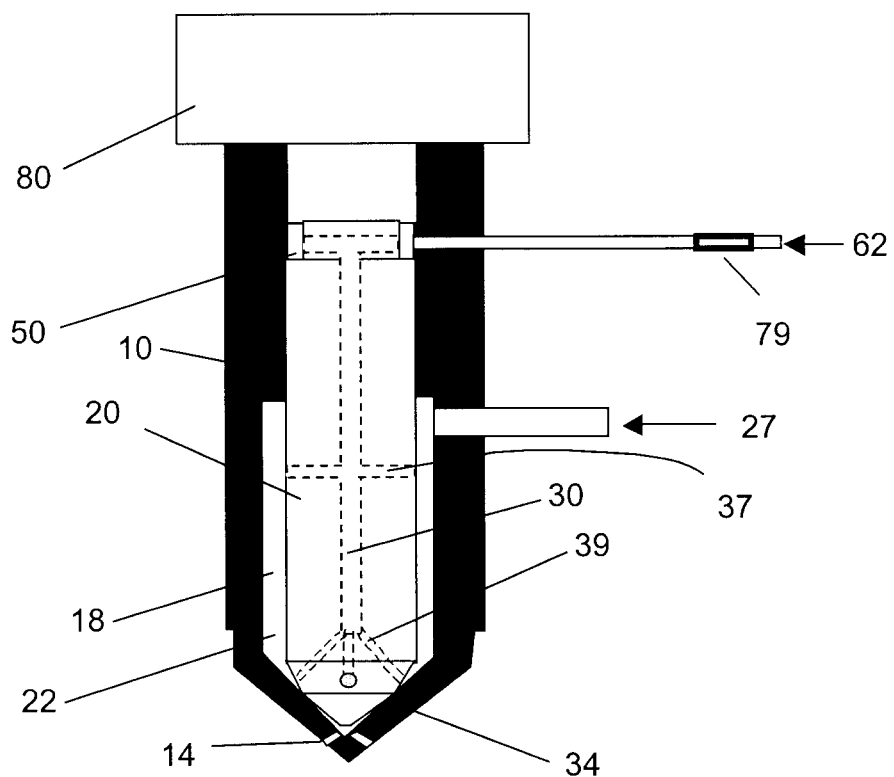
FIG. 5 is a cross sectional view of an injector according to the schematic drawing of FIG. 4.

Turning now to FIG. 5, this embodiment is an example of a physical schematic that embodies the features shown by the flow schematic of FIG. 4. This embodiment can use any needle actuation method (shown generically as box 80) such as, for example, the hydraulic methods of the other injectors, mechanical methods, or direct actuation methods comprising piezoelectric, magnetostrictive or solenoid actuators.). In this embodiment, $R_{L1}$ from the schematic of FIG. 4 is a removable, replaceable orifice 79 disposed in liquid supply line 62, while $R_{L2}$ and $V_1$ are built into the liquid passages 30 and 39. Note that $R_{L1}$ can be placed external to the injector, in injector body 10, or in hollow needle 20. $R_G$ is integral with the gas passages from supply line 27 through to lower chamber 22, which is defined by the portion of central cavity 18 that is disposed between injector body 10 and needle 20. Lower chamber 22 is $V_2$ in FIG. 4. Because the liquid is introduced into the gas near needle seat 34, pressure $P_S$ (in the earlier schematic) is a strong function of the needle lift. When needle 20 lifts from seat 24 and gas flows through orifices 14, there is a pressure difference between upper passages 37 and lower passages 39 which allows gas to enter passage 30, forcing liquid through passages 39. When designing an injector for the requirements of a specific engine, to achieve the desired flow characteristics, liquid metering, and operational goals, one can adjust the size of reservoirs $V_1$ and $V_2$ by the selecting the size of the passage 30 and lower chamber 22, and the flow resistances through the selection of diameters for the fluid passages and orifices, and the location along the needle where the liquid is introduced.

The key to this embodiment is that liquid pressure at supply line 62 is controlled above gas pressure at line 27, so the liquid flow into passage 30 is regulated by resistance 79 (which can be placed inside the injector body or needle). The other important aspect of this embodiment is that once gas flow is established, a pressure differential between upper passages 37 and lower passages 39 drives gas into core passages 30, flushing liquid out of the needle and into the gas flow during the early part of injection events.

Dual-Actuator Apparatus

Greater control of the liquid and gas mass ratio during the injection event can be achieved by using 2 actuators.

Figure 6:
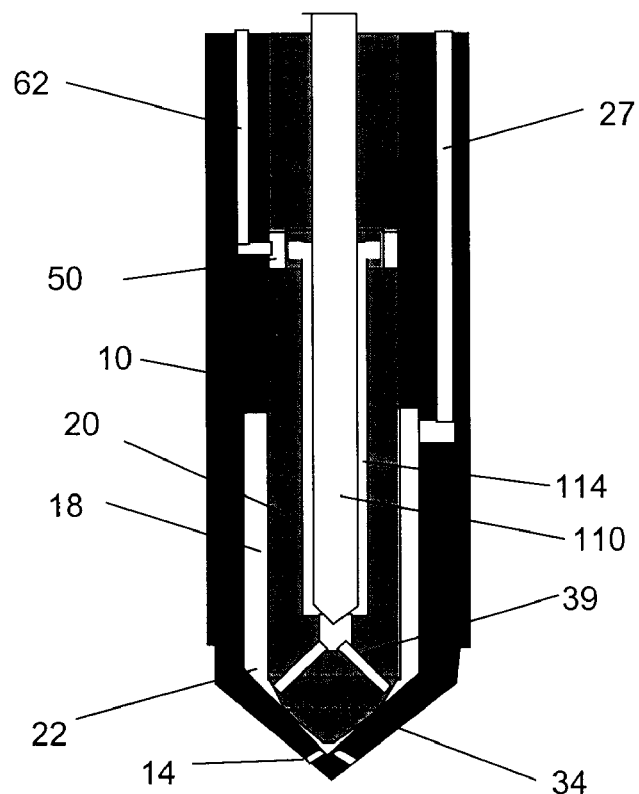
FIG. 6 is a cross section of an injector tip of an embodiment of the invention employing the 2-needle movement taught by Touchette et al. (U.S. Pat. No. 6,073,862), but modified to inject the liquid and gas through the same holes.

Turning to FIG. 6, another embodiment of the present invention is shown. Needle movement is controlled by means of the prior art as taught in U.S. Pat. No. 6,073,862 to Touchette et al. and owned by Westport Power Inc., the disclosure of which is incorporated herein by reference. The complete injector exemplified in FIG. 6 is fundamentally different from that of the '862 patent, however, because the tips are designed to produce co-injection as described in the above description. FIG. 6 shows only the lower portion of injector body 10 with a double needle assembly extending into central cavity 18. Liquid needle 110 and main needle 20 can be raised or lowered independently from each other. Pressurized liquid is supplied from supply passage 62 through the annular groove 50 in main needle 20 into annular cavity 114 between liquid needle 110 and main needle 20. Liquid supply pressure $P_L$ is higher than gas pressure $P_G$, supplied to lower chamber 22 from gas supply passage 27 so that by lifting liquid needle 110 for controlled durations and times, any amount of liquid can be injected through passages 39 into lower chamber 22. When needle 20 is lifted from seat 34, liquid is drawn into chamber 22 and entrained in the gas, and then the gas and liquid mixture is injected into the combustion chamber through orifices 14 where the liquid is atomized by the expanding gas.

In another embodiment, the liquid flow can be controlled by a mechanical, distributor pump of the type found on many small diesel engines. These pumps are designed to provide metered quantities of liquid fuel at variable timing, with a separate line to each injector. In this embodiment, the gas injection is controlled by a direct actuator, and the liquid injection by the separate liquid pump. The injector can appear identical to that of FIG. 4 except that a check-valve is inserted in the liquid supply line to prevent liquid backflow when the liquid fuel distributor pump pressure drops below the gas rail pressure.

Operation

Figure 7:
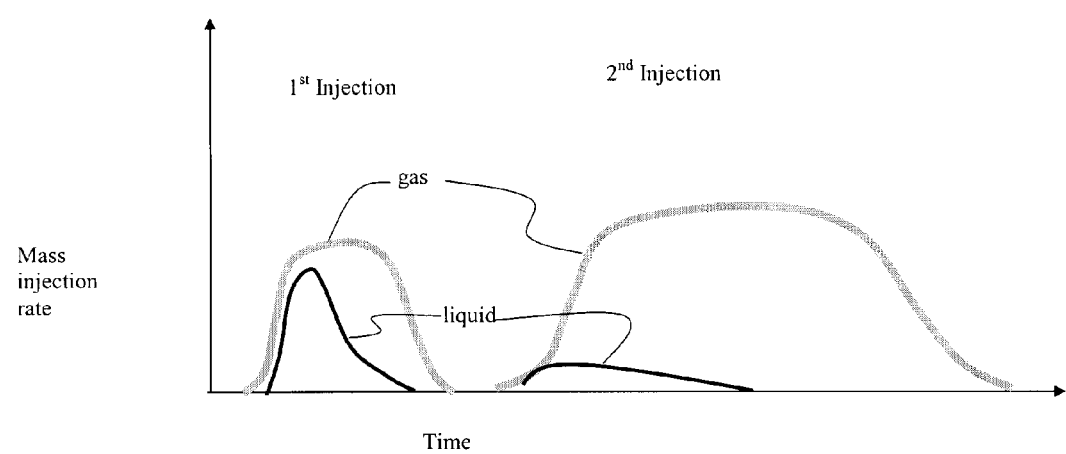
FIG. 7 is a graph showing the relative timing of the liquid and gas fuel injection as a function of time according to the double injection strategy.

Now referring to FIG. 7, the relative timing of the liquid and gas injections are shown as a function of time. In this example of a preferred embodiment, the majority of the liquid injection occurs during the period when the first 50% by mass, of the gas is injected. As shown by the double injection pulse in FIG. 7, a multiple injection strategy can be used, in which the needle opens and closes more than once. This can be beneficial in reducing emissions and noise at high load. In such operation, nearly all of the liquid fuel is injected during the first injection event. Operation with a single injection pulse is also possible. If the pulse width of the first injection pulse is extended for a longer duration to inject more gas into the combustion chamber, it is desirable and possible with the disclosed method and injectors for the liquid fuel to follow a profile that is the same or similar to that shown in FIG. 7, with most of the liquid fuel injected near the beginning of the fuel injection pulse. That is, while the shape of the gas mass injection rate profile can change to accommodate different fuelling requirements for different engine loads and operating conditions, the shape of the liquid mass injection rate profile can stay substantially the same with most of the liquid injected close to the beginning of the injection event. For some engines, while it can be desirable to adjust the liquid mass flow rate for different operating conditions, for all embodiments it is preferable for most of the liquid fuel to be injected near the beginning of the injection event.

The heart of the method is phasing the liquid and gas injections in the appropriate way. With the disclosed method the initial injection is enriched in liquid to encourage rapid ignition, but little or no liquid is injected late in the injection event, which is desirable because later injected liquid fuel can cause higher emissions. If a constant liquid/gas mass ratio is provided throughout the injection event, because of the ignition requirements at the beginning of the injection event, overall demand for liquid, by mass, would be higher than needed—greatly decreasing the utility of an engine fuelled with liquid and gas, which is aimed at increasing the amount of gaseous fuel burned to reduce emissions from a compression ignition engine.

Small quantities of liquid can be injected just before the first gas leaves the injector, but this relative advancement of the liquid should be small enough so that the gas can overtake the liquid spray in the combustion chamber, promoting atomization.

Generally the total mass of liquid injected can be up to about 50% of the total mass of gas injected, with the exact mass ratio of gas and diesel depending on load and the ignition characteristics of the liquid and gaseous fuels. Over the entire operating range of an engine, an engine using one of the disclosed methods and apparatus can normally operate with the liquid fuel being a much lower mass percentage than 33% of the total fuel injected. The mass percentage of liquid fuel is generally in the higher end of the normal operating range when only very small quantities of fuel are needed, for example when the engine is idling or under low load, since a minimum of liquid fuel is generally needed to assist with ignition of the gaseous fuel.

With the present invention particular (different) phasing of the gas and diesel co-injection can be used to minimize emissions for mostly non-premixed combustion. The relative phasing of the injections is discussed above.

Figure 8:
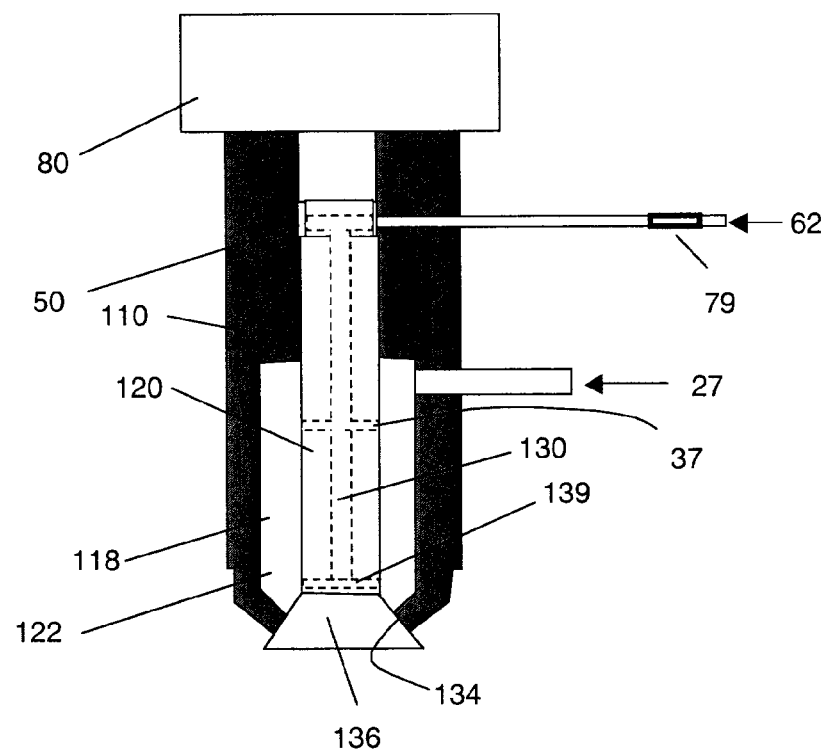
FIG. 8 is a cross-sectional view of an injector according to a further embodiment comprising a poppet-style injector which has an outward lifting valve needle.

The illustrated preferred embodiments of the fuel injector employ an inward lifting needle with a multi-hole nozzle tip through which the gaseous and liquid fuel can be concurrently injected into the combustion chamber. These preferred embodiments can deliver suitable fuel distribution within the combustion chamber which is important for reducing emissions and improving engine performance and combustion efficiency. However, the disclosed method can also be employed with a poppet-style injector which has an outward lifting valve needle. The disclosed methods for metering the liquid fuel and controlling the timing for dispensing liquid fuel can be adapted to a poppet-style injector as shown in FIG. 8. In FIG. 8, parts that are identical to those of third embodiment of FIG. 5 are labeled with the same reference number. In this case, poppet valve member 120 includes a tapered head 136 adapted to seal against seat 134. As in previous embodiments, a liquid fuel passage 130 is provided through the valve member so that the liquid fuel can be entrained into the gaseous fuel within chamber 122, which is defined by cavity 118 between valve body 110 and valve member 120. A plurality of exit bores 139 extend radially from passage 130 within the valve member to lower chamber 122 above needle seat 134.

In preferred embodiments, the liquid fuel of the present invention is a liquid fuel with a lower auto-ignition temperature compared to the gas, for example including but not limited to diesel, synthetic diesel, DME (dimethyl ether), biodiesel, straight vegetable oil and water emulsions of any of these. The liquid can be used to initiate the combustion within the combustion chamber of an ignition compression engine. The various embodiments of the present invention allow entrainment of the liquid fuel within the gaseous fuel inside the injector to assist with atomization of the liquid fuel on injection into the combustion chamber of the engine. Such gas-blasted atomization of the liquid fuel can aid in the use of relatively unrefined liquid fuels, such as for example, straight vegetable oil.

The gaseous fuel can include, but is not limited to natural gas, syngas, biogas, hydrogen, and blends thereof. The gaseous fuel can have an auto ignition temperature higher than that of the liquid fuel and can comprise the majority of the combustion reaction within the combustion chamber after combustion is initiated by the liquid fuel A number of variations of the injector can be utilized, such as:
1. The manner in which the injector is actuated (hydraulic, mechanical, piezo, solenoid etc.)
2. The number of actuators used (normally 1 or 2)
3. The method of providing high-pressure liquid fuel (common rail pump, distributor pump, mechanical unit injector pump)
4. The method of controlling the relative injection timing of the gas and liquid fuel (direct electronic control in 2-actuator embodiments; hydraulic methods based on flow reservoirs and resistances with known time constants; liquid flow controlled by the position of the valve needle.

The following provides a list of features and/or advantageous that can be available when practicing the present invention and or applications to which or by which the present invention can be applied:
1. A single injector for the co-injection of a gaseous fuel blend and liquid fuel.
2. Single actuator (solenoid, piezo, or other type used today in fuel injectors) causes needle lift and controls both gas and liquid injections.
3. The injector sliding seals can be made leak-tolerant and constructed using normal or lower than normal machining tolerances because a) the liquid and gas pressures can be nearly balanced and b) if there is a leak a small quantity of liquid can collect in the gas passages/cavity of the injector, but such leaked-liquid is no threat to the operability of the injection because the gas purges these spaces when gas is injected with every cycle.
4. Only a single gas-tight contact seal is needed in the injector. This is constantly lubricated by liquid fuel, and seals against a maximum pressure of only 200-400 bar (compared to 1000 bar for a modern diesel injector).
5. The relative supply pressures of the gas and liquid control leakage rates within the injector and the amount of liquid fuel injected. This provides for a simple way of tuning the injectors for performance or emissions, possibly in response to different operating modes.
6. The liquid can include water-based emulsions. By virtue of co-injection (as opposed to segregated liquid and gas injection through separate nozzle orifices), the water can mix with the gaseous fuel, which can be beneficial for reducing emissions.
7. The liquid atomization is caused by the high gas flow, and not controlled by the liquid passage dimensions. This simplifies the injector fabrication.
8. The injector holes are larger than those of a conventional diesel injector, and therefore easier to machine and clean.
9. The injector tip is structurally similar to that of a conventional diesel injector, but experiences lower pressures, so stresses are reduced. Compared to an injector that injects liquid and gas separately, the geometry is less complex and the structural design can be easier to manufacture.

While specific embodiments of the invention have been described and illustrated, such embodiments should be considered illustrative of the invention only and not as limiting the invention as construed in accordance with the accompanying claims.

What is claimed is:

1. A method for concurrently injecting a liquid fuel and a gaseous fuel directly into a combustion chamber of an internal combustion engine, the method comprising:
   delivering the gaseous fuel to a fuel injector;
   delivering the liquid fuel to the fuel injector;
   injecting the gaseous and liquid fuels into the combustion chamber by actuating a valve member, whereupon liquid fuel is entrained into the gaseous fuel within a chamber of the injector, and a mixture of gaseous fuel and liquid is injected into the combustion chamber where the expanding gaseous fuel atomizes the liquid fuel; and
   controlling the mass ratio of the liquid and gaseous fuels during the injecting step so that a majority of the liquid fuel is injected closer to the start rather than the end of the injecting step.

2. The method of claim 1 further comprising holding most of the liquid fuel within the fuel injector separate from the gaseous fuel when not performing the injecting step.

3. The method of claim 1 wherein most of the liquid fuel is entrained into the gaseous fuel during the injecting step.

4. The method of claim 1 further comprising stopping the delivery of liquid fuel to the fuel injector during an injecting step to help in controlling the mass ratio of the liquid and gaseous fuels during the injecting step.

5. The method of claim 1 further comprising metering the liquid fuel entrained into the gaseous fuel during the injecting step.

6. The method of claim 1 wherein the step of delivering the liquid fuel comprises delivering it into a passage provided within the valve member.

7. The method of claim 1 wherein the step of delivering the gaseous fuel comprises delivering it into a nozzle chamber defined by the space between the valve member and a nozzle body of the fuel injector.

8. The method of claim 7 wherein the liquid fuel is delivered into a passage provided within the valve member and dispensed from the passage into the gaseous fuel in the nozzle chamber.

9. The method of claim 8 wherein the liquid fuel is dispensed from the passage into the gaseous fuel through orifices fluidly connecting the passage to the nozzle chamber.

10. The method of claim 9 further comprising displacing the liquid fuel from the passage with a plunger.

11. The method of claim 9 further comprising displacing the liquid fuel from the passage with the gaseous fuel.

12. The method of claim 8 further comprising metering the liquid fuel before delivering the liquid fuel to the passage.

13. The method of claim 12 wherein the metering step is effected by opening and closing communication between the passage and a liquid fuel supply line by movement of the valve member.

14. The method of claim 12 wherein the metering step if effected by operation of a control valve that regulates the flow of the liquid fuel.

15. The method of claim 12 wherein the metering step is effected by orifices sized to restrict the flow of the liquid fuel.

16. The method of claim 8 further comprising metering the liquid fuel before delivering the liquid fuel from the passage to the nozzle chamber.

17. The method of claim 16 wherein the valve member is a primary valve needle and the metering step is effected by operation of a secondary valve needle disposed within the primary valve needle, wherein the secondary valve needle is operable to control the dispensing of liquid fuel from the passage to the nozzle chamber and the primary valve needle is operable to control the opening and closing of the injection valve to inject the gaseous and liquid fuel into the combustion chamber.

18. The method of claim 1 wherein the injecting step comprises first injecting gaseous fuel into the combustion chamber before injecting a mixture of gaseous and liquid fuel into the combustion chamber, while still injecting a majority of the liquid fuel closer to the start rather than the end of the injecting step.

19. The method of claim 1 further comprising injecting the mixture of gaseous fuel and liquid fuel into the combustion chamber through orifices provided in a nozzle of the fuel injector.

20. The method of claim 1 wherein the amount of liquid fuel entrained in the injecting step is no more than 50% of the mass of the gaseous fuel injected during the injecting step.

21. The method of claim 1 further comprising injected the majority of the liquid fuel during a period of the injecting step when the first 50% by mass of the gaseous fuel is injected.

22. The method of claim 1 further comprising mixing the liquid fuel with water before delivering it to the injection valve.

23. The method of claim 1 further comprising maintaining about equal the pressure of the liquid fuel and the gaseous fuel held inside the fuel injection valve.

24. The method of claim 23 further comprising biasing the liquid fuel pressure within the injection valve to be slightly higher than the pressure of the gaseous fuel, to prevent gaseous fuel from leaking into the liquid fuel, while keeping the bias low to reduce the amount of liquid fuel that leaks into the gaseous fuel.

25. The method of claim 1 further comprising repeating the injecting step more than once in a combustion cycle, with the majority of the liquid fuel injected into the combustion chamber with the first injecting step.

26. The method of claim 25 further comprising metering the liquid fuel so that liquid fuel is only injected in the first injecting step.

27. A fuel injector for concurrently injecting a liquid fuel and a gaseous fuel directly into a combustion chamber of an internal combustion engine, the fuel injector comprising:
   a fuel injector body;
   a valve member, disposed in a cavity provided within the fuel injector body, and moveable between a closed position when a sealing surface of the valve member is pressed against a seat, and an open position when the valve member is lifted from the seat;
   a nozzle chamber defined by an annular space between the valve member and the fuel injector body, and in fluid communication with the combustion chamber when the valve member is in the open position;
   a gaseous fuel supply line in fluid communication with the nozzle chamber through which gaseous fuel is deliverable into the nozzle chamber;
   an interior passage disposed within the valve member into which the liquid fuel is deliverable from a liquid fuel supply line; and
   a metering device operatively associated with the fuel injector for controlling dispensing of the liquid fuel from the interior passage into the nozzle chamber so the liquid fuel is entrained in the gaseous fuel flowing through the nozzle chamber during an injection event and so that the majority of the liquid fuel is injected closer to the start rather than the end of the injection event.

28. The injection valve of claim 27 wherein the metering device comprises orifices between the interior passage and the nozzle chamber.

29. The injection valve of claim 27 wherein the metering device comprises a control valve that is operable to regulate flow of liquid fuel to the interior passage.

30. The injection valve of claim 27 wherein the liquid fuel is delivered from the liquid fuel supply line to the interior passage through a connecting passage, which is blocked when the valve member moves from the closed position to an open position.

31. The injection valve of claim 27 wherein the metering device comprises an orifice between the liquid supply line and the interior passage.

32. The injection valve of claim 27 wherein the metering device comprises a plunger operable within the interior passage to displace the liquid fuel therefrom.

33. The injection valve of claim 32 wherein the amount of the liquid fuel that is displaced by the plunger is a function of the linear movement of the valve member.

34. The injection valve of claim 32 wherein the plunger is stationary relative to the fuel injector body and valve member is moveable relative to the plunger.

35. The injection valve of claim 27 further comprising at least two orifices connecting the interior passage to the nozzle chamber with one orifice spaced longitudinally from the other orifice with the lower orifice closer to the seat where, during injection events, the velocity of the gaseous fuel flowing past the lower orifice generates a venturi effect that draws liquid fuel from the interior passage, and as the liquid fuel is drawn from the interior passage, gaseous fuel can be drawn into the interior passage through the upper orifice to purge the liquid fuel from the interior passage.

36. The injection valve of claim 35 wherein the nozzle chamber is shaped to comprise a restricted flow path near the lower orifice to increase the velocity of the gaseous fuel flowing past the lower orifice and increase the venturi effect.

37. The injection valve of claim 27 wherein the metering device comprises a needle valve disposed within the valve member, the needle valve being operable independent from the valve member to dispense the liquid fuel from the interior passage to the nozzle chamber.

38. The injection valve of claim 27 wherein the valve member is a valve needle that is retractable into the fuel injector body to open the fuel injector and inject the gaseous and liquid fuels into the combustion chamber through orifices disposed in a nozzle tip.

* * * * *